United States Patent
Engstrom et al.

(10) Patent No.: US 7,613,446 B2
(45) Date of Patent: Nov. 3, 2009

(54) WIRELESS MOBILE PHONE WITH AUTHENTICATED MODE OF OPERATION INCLUDING FINGER PRINT BASED AUTHENTICATION

(75) Inventors: G. Eric Engstrom, Kirkland, WA (US); Peter Zatloukal, Kirkland, WA (US)

(73) Assignee: Varia, LLC, Seattle, WA (US)

( * ) Notice: Subject to any disclaimer, the term of this patent is extended or adjusted under 35 U.S.C. 154(b) by 53 days.

(21) Appl. No.: 10/550,925

(22) PCT Filed: Mar. 26, 2004

(86) PCT No.: PCT/US2004/009781
§ 371 (c)(1),
(2), (4) Date: Sep. 11, 2006

(87) PCT Pub. No.: WO2004/089011
PCT Pub. Date: Oct. 14, 2004

(65) Prior Publication Data
US 2007/0090918 A1    Apr. 26, 2007

Related U.S. Application Data

(60) Provisional application No. 60/458,314, filed on Mar. 28, 2003.

(51) Int. Cl.
*G06K 9/00* (2006.01)

(52) U.S. Cl. ...................................... 455/411; 380/247
(58) Field of Classification Search ................. 455/410, 455/411, 558, 556.1; 380/247, 249, 250
See application file for complete search history.

(56) References Cited

U.S. PATENT DOCUMENTS

| | | | |
|---|---|---|---|
| 5,913,175 A | 6/1999 | Pinault | |
| 5,999,806 A * | 12/1999 | Kaplan et al. | ................ 455/411 |
| 2002/0052192 A1 | 5/2002 | Yamazaki et al. | |
| 2002/0083329 A1 | 6/2002 | Kiyomoto | |
| 2003/0099380 A1 * | 5/2003 | Gozzini | ....................... 382/124 |

* cited by examiner

*Primary Examiner*—Sam Bhattacharya
(74) *Attorney, Agent, or Firm*—Schwabe, Williamson & Wyatt P.C.

(57) ABSTRACT

A wireless mobile phone is equipped to operate in an unauthenticated and an authenticated mode of operation, depending on whether a user has been authenticated. In one embodiment, the wireless mobile phone includes a finger print reader to enable a user's finger print to be inputted and be used for authentication. In one embodiment, the finger print reader includes a light source and sensors, and having complementary logic to process emitted light reflected off a user's finger into an input finger print. The user is authenticated using the inputted finger print. In one embodiment, the finger print reader is integrated with a power on/off switch, which may be disposed on an end surface, a side surface or a front surface of the body of the phone.

16 Claims, 9 Drawing Sheets

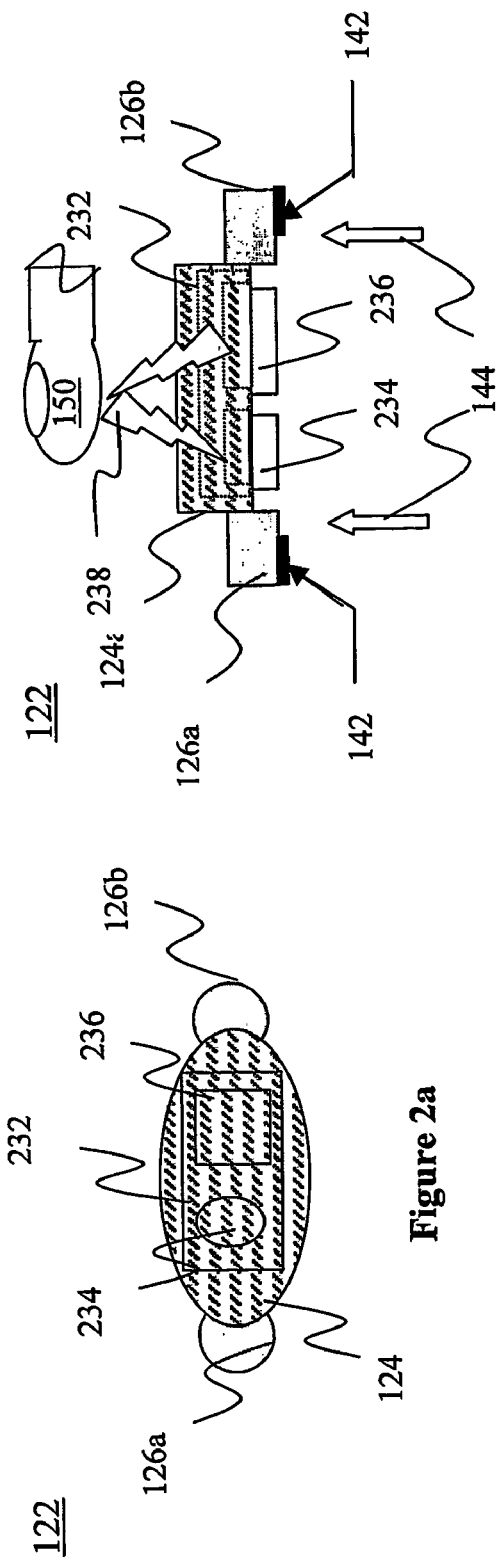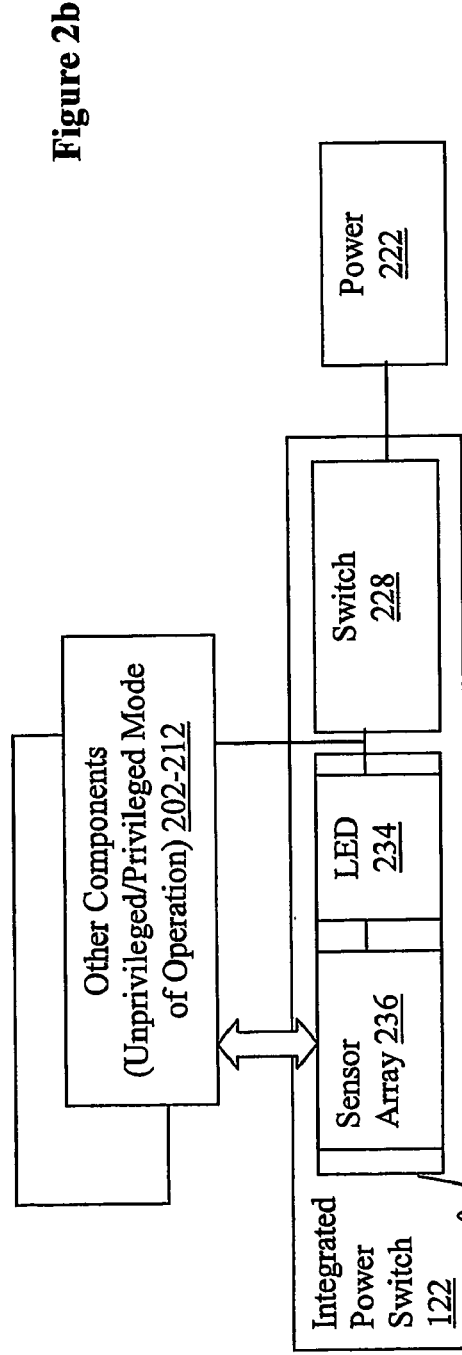

WIRELESS MOBILE PHONE WITH AUTHENTICATED MODE OF OPERATION INCLUDING FINGER PRINT BASED AUTHENTICATION

RELATED APPLICATION

The present invention claims priority to provisional application No. 60/458,314, filed Mar. 28, 2003, entitled "A Wireless Mobile Phone With Authenticated Mode Of Operation Including Finger Print Based Authentication", and incorporated in its entirety by reference.

FIELD OF THE INVENTION

The present invention relates to the field of wireless mobile communication. More specifically, the present invention is related to, but not limited to, a wireless mobile phone having an authenticated mode of operation available only to an authenticated user, in particular, a user authenticated via the user's finger print.

BACKGROUND OF THE INVENTION

Advances in microprocessor and telecommunication technology have led to wide spread deployment and adoption of mobile devices, such as wireless mobile phones. For wireless mobile phones, in addition to wireless telephony, the late models are often equipped with advanced capabilities, such as calendar, address book, access to the World Wide Web (WWW), emails, and so forth.

Much of these functionalities are designed to increase the productivity of business users. As a result, it is not surprising that business users constitute a major user segment of wireless mobile phones, especially for the high-end function rich models. Increasingly, more business data, such as business contact information, business plans, sales/marketing strategies, financial reports, and so forth, are being stored on wireless mobile phones.

However, unlike personal computers or other computing devices, where user authentication, through e.g. user log-in, are routinely provided with virtually all operating systems, few if any operating systems of wireless mobile phones provide means to authenticate users. As a result, under the prior art, wireless mobile phones are at risk of unauthorized usage, as well as data being compromised by unauthorized accesses.

BRIEF DESCRIPTION OF THE DRAWINGS

The present invention will be described by way of exemplary embodiments, but not limitations, illustrated in the accompanying drawings in which like references denote similar elements, and in which:

FIGS. 2a-2b illustrate a top view and a side view of the power switch of FIG. 1, having an integrated finger print reader, in accordance with one embodiment;

FIGS. 3a-3b illustrate two architectural views of the wireless mobile phone of FIG. 1, In accordance with one embodiment;

DETAILED DESCRIPTION OF EMBODIMENTS OF THE INVENTION

Embodiments of the present invention includes but not limited to a wireless mobile phone having an authenticated mode of operation, available only to an authenticated user, in particular, a user authenticated by the user's finger print.

Parts of the description will be presented in terms commonly employed by those skilled in the art to convey the substance of their work to others skilled in the art. The term "wireless mobile phone" as used herein (in the specification and in the claims) refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

In the following description, various aspects of the present invention will be described. However, it will be apparent to those skilled In the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful In understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
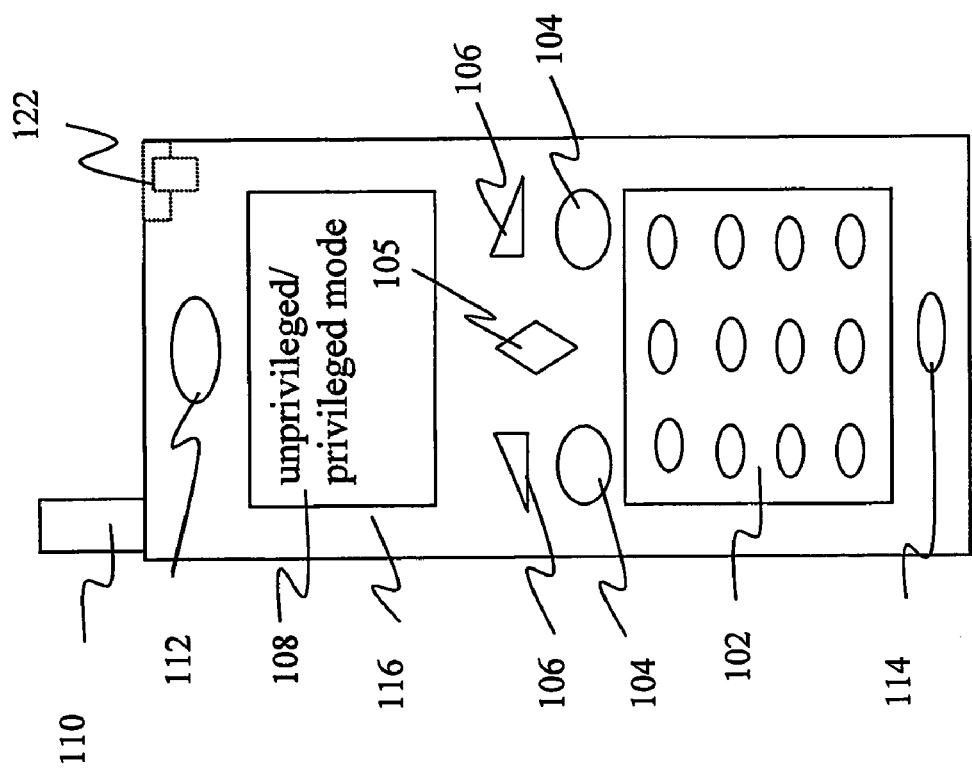
FIG. 1 illustrates a front view of a wireless mobile phone incorporated with the teachings of the present invention, in accordance with one embodiment.
Figure 3B:
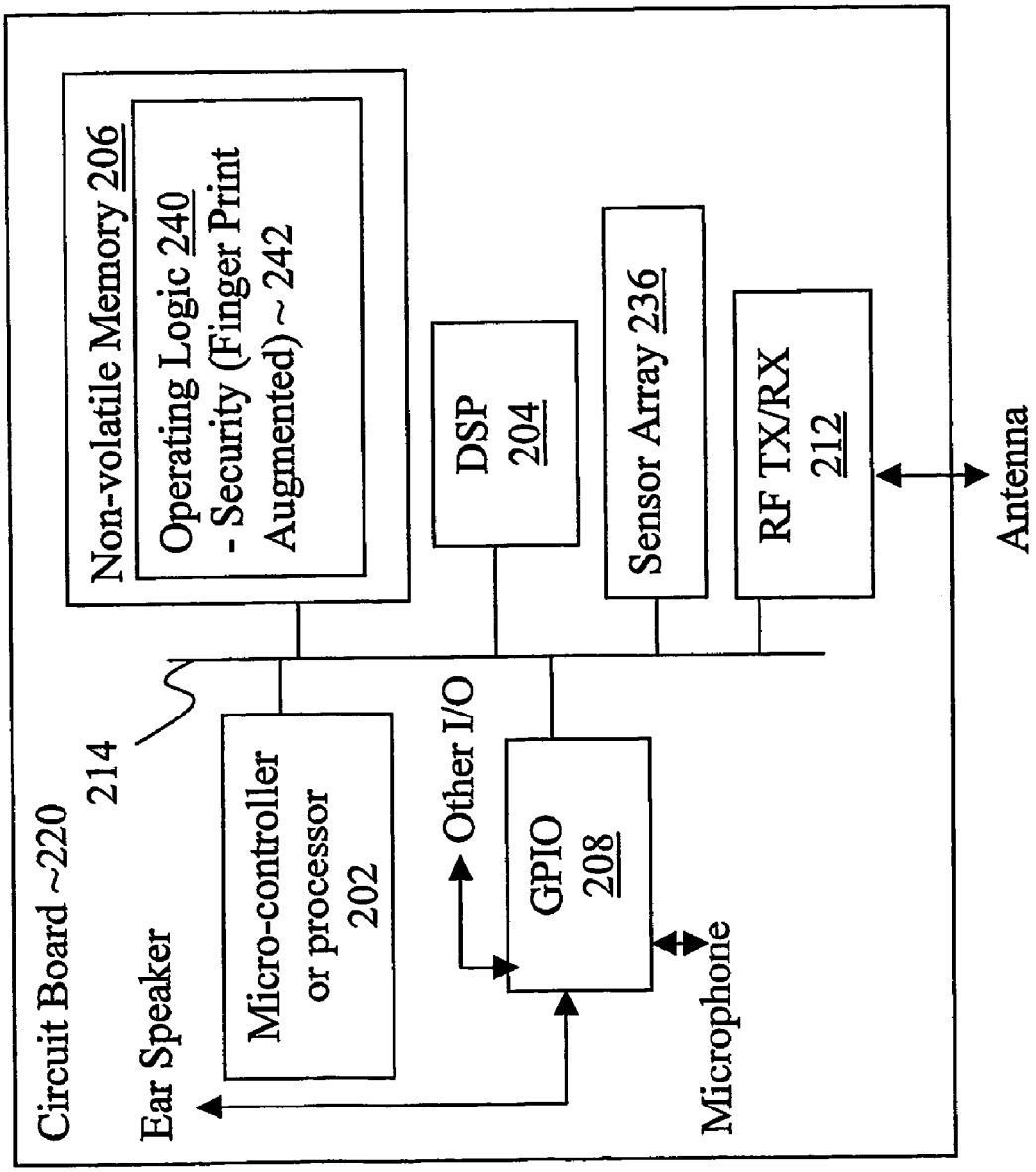

Referring now to FIGS. 1 and 3a-3b, wherein a front view and two architecture (internal component) views of a wireless mobile phone of the present invention, in accordance with one embodiment, are shown. As illustrated, wireless mobile phone 100 of the present invention (hereinafter, simply phone 100) is advantageously provided with operating logic 240 equipped in particular with security function 242, to operate phone 100 in at least an unauthenticated mode of operation and an authenticated mode of operation.

While operating in the unauthenticated mode of operation, i.e. without having the user authenticated, operating logic 240 makes available only a limited or reduced set of functions, whereas under the authenticated mode of operation, i.e. having the user authenticated, operating logic 240 makes available a more expanded or the entire set of functions.

The exact constitution of the limited/reduced set of functions and the expanded/full set of functions is application dependent, which may vary from embodiments to embodiments. In one embodiment, the limited/reduced set of functions include only the ability to make an emergency call, such as a 911 call, otherwise, no other functions, including but not limited to making other calls, accessing calendar, email, text messaging, viewing and/or storing documents, and so forth, are permitted. These other functions are available only under the authenticated mode.

In another embodiment, the limited/reduced set of functions may effectively be a null function set, excluding even the ability to make an emergency call, except for notification of the unauthenticated status of the user, and perhaps, inviting the user to authenticate himself/herself, by e.g. providing a finger print input.

In various embodiments, in addition to the above described unauthenticated and authenticated modes of operation, operating logic 240 further supports a provisioning mode of operation, under which phone 100 is initially provisioned. Under the initial provisioning mode, conventional provisioning, such as configuring phone 100 for a particular wireless carrier, a particular subscriber and so forth, may be performed. Entry into the initial provisioning mode may be effectuated in any one of a number of conventional approaches.

Continue to refer to FIGS. 1 and 3a-3b, for the illustrated embodiment, phone 100 is further advantageously equipped with finger print reader 232 to facilitate a user to input his/her finger print, and security function 242 is equipped to authenticate the user by the user's inputted finger print. In other words, operating logic 240 operates phone 100 in the authenticated mode, and makes available the expanded/full set of functionalities, only if the user has been authenticated by his/her finger print, otherwise, phone 100 is operated in the unauthenticated mode with only a limited/reduced set of functionalities (except in the initial provisioning mode).

For the embodiment, operating logic 240, more specifically, security function 242, also supports the provision of a finger print, and its saving in the form of an image, for use as a reference to authenticate an inputted finger print for authentication of a user, and operation of phone 100 in the authenticated mode. In various embodiments, the saving of the reference finger print image is also supported under a special configuration mode, while operating in the authenticated mode. Entry into the configuration mode (while operating in the authenticated mode) may also be effectuated in any one of a number of conventional means.

Further, for the illustrated embodiment, finger print reader 232 is advantageously integrated with power on/off button 122, to enable a users finger print to be inputted seamlessly as part of the power-on process.

Moreover, for the illustrated embodiment, power on/off button 122 (integrated with finger print reader 232) is disposed at the top end surface of body 116 of phone 100. As will be described in more detail below, referencing FIGS. 5 and 6a-6b in particular, power on/off button 122 (integrated with finger print reader 232) may be disposed on other surfaces of the body of a wireless mobile phone.

Referring now also to FIGS. 2a-2b, wherein a top view and a side view of power on/off button 122 with integrated finger print reader 232 is illustrated in further detail, in accordance with one embodiment. As illustrated, for the embodiment, power on/off button 122 includes transparent body 124 (which transparency is represented by the hash lines) having flanges 126, which undersides include contacts 142. Contacts 142 are employed to close/open switch circuit 228, as power on/off button 122 is moved from a rest position to a depressed position. When closed, switch circuit 228 allows power from power supply 222 to be provided to from finger print reader 232 and other components 202-212 of phone 100. When open, switch circuit 228 cutoffs power of power supply from finger print reader 232 and other components 202-212 of phone 100. Power on/off button 122 also includes a counter-force exerting means (not shown), such as a spring like assembly, to exert a counterforce to restore power on/off position 122 from the depressed position to its rest position.

For the embodiment, finger print reader 232 includes light source 234 and sensors 236. Light source 234 is employed to emit light, and sensors 236 are employed to sense the emitted light (passing through transparent body 124 of power on/off button 122) and reflected off finger 150 of the user (back through transparent body 124 of power on/off button 122). In one embodiment, light source 234 comprises one or more light emitting diodes (LED), and sensors 236 comprise an array of micro photo sensors.

Sensors 236 output signals responsive to the reflected light sensed. The signals in turn are processed by DSP 204 into an image, more specifically, an input finger print image. Security function 242, executed by processor 202, in turn compares the input finger print image against the reference finger print image to authenticate the user.

In alternate embodiments, non-optical finger print readers, such as capacitance based finger printer readers may be employed instead. For these embodiments, sensors 236 output signals responsive to the electrical interactions between the embedded capacitors and the user's finger, which vary according to the print contour. The signals output by sensors 236 may be processed into a finger print data structure and/or image. In yet other embodiments, other non-capacitance based, non-optical finger print readers may be employed instead.

Referring again to FIGS. 1 and 3a-3b, additionally, phone 100 includes conventional wireless telephony elements, including audio communication elements, such as ear speaker 112 and microphone 114, and non-audio communication elements, such as input key pad 102 having a number of alphanumeric input keys and display 108. Further, the non-audio input elements may further include scroll button 105, selection buttons 106, and "talk" and "end talk" buttons 104. These elements are disposed on various external surfaces of body 116.

Externally, phone 100 may also include antenna 110. Keys of key pad 102 may be surrounded by, or otherwise include illuminable light emitting diodes (LED) in their backgrounds. For the purpose of the present specification, the terms "button" and "key" may be considered synonymous, unless the context clearly indicates otherwise.

Internally, in addition to processor 202 and DSP 204, phone 100 also includes non-volatile memory 206, general purpose input/output (GPIO) interface 208, and transmit/receive (TX/RX) 212, coupled to each other, processor 202 and DSP 204, via bus 214, and disposed on a circuit board 220.

Except for novel manner that many of these elements, such as processor 202, DSP 204 and so forth, are used in support of making the expanded/full set of functionalities available only to an authenticated user, the enumerated elements otherwise perform their conventional functions known in the art Non-volatile memory 206 is employed to store programming instructions and optionally, working data, including operating logic 240 and its security function 242. Working data may include callee/messaging party or parties (e.g. their phone numbers or IP addresses) with whom user may communicate. Working data may include the reference and input finger print images of the user.

Processor 202, assisted by DSP 204, is employed to operate phone 100, executing operating logic 240, including security function 242.

Keys of key pad 102 may be employed to enter alphanumeric data, including entering a sequence of alphanumeric data for the phone number or address of a "callee". Selected sequence of the keys (such as "*#") may also be employed to denote a user instruction to return to the unauthenticated mode of operation, if entered while operating in the authenticated mode of operation, or to return to the authenticated mode of operation, if entered while operating in the unauthenticated mode of operation (provided the user is authenticated).

Scroll key 105 and companion selection keys 106 may be employed to scroll and select various options or list items of various menu options or selection lists, including scrolling and selecting list items presented for user interactions to verify the user's wellness. For the embodiment, scroll key 105 may be selected in one of two positions, an "up" position or a "down" position for scrolling a selection list in an "up" direction and a "down" direction respectively. Similarly, scroll and selection keys 105/106 may also be employed to select a menu item to convey a user instruction to return to the unauthenticated mode, if the selection is made while operating in the authenticated mode, or to return to the authenticated mode, if the selection is made while operating in the unauthenticated mode (provided the user is authenticated).

GPIO 208 may be employed to generate input signals, such as a corresponding "alphanumeric" signal in response to a user selection of one of the keys of key pad 102, a "scroll" signal" (or more specifically, a "scroll up" or a "scroll down" signals) in response to a user selection of scroll key 105, a "selection" signal in response to a user selection of select button 106, and so forth.

TX/RX 212 may be employed to transmit and receive communication signals for a call and/or a text message. TX/RX 212 may be a radio frequency transceiver, and support one or more of any of the known signaling protocols, including but are not limited to CDMA, TDMA, GSM, and so forth.

The constitutions of these elements are known, and will not be further described.

As to operating logic 240, including security function 242, it may be implemented in the assembly or machine instructions of processor 202, or a high level language that can be compiled into these assembly or machine languages.

Accordingly, except for the enhancements provided, phone 100 otherwise represents a broad range of wireless mobile phones, including both the analog as well as the digital types (of all signaling protocols), substantially rectangular uni-body as illustrated, or curved uni-body, as well as multi-portions, such as "flip phones" to be illustrated later.

Figure 4A:
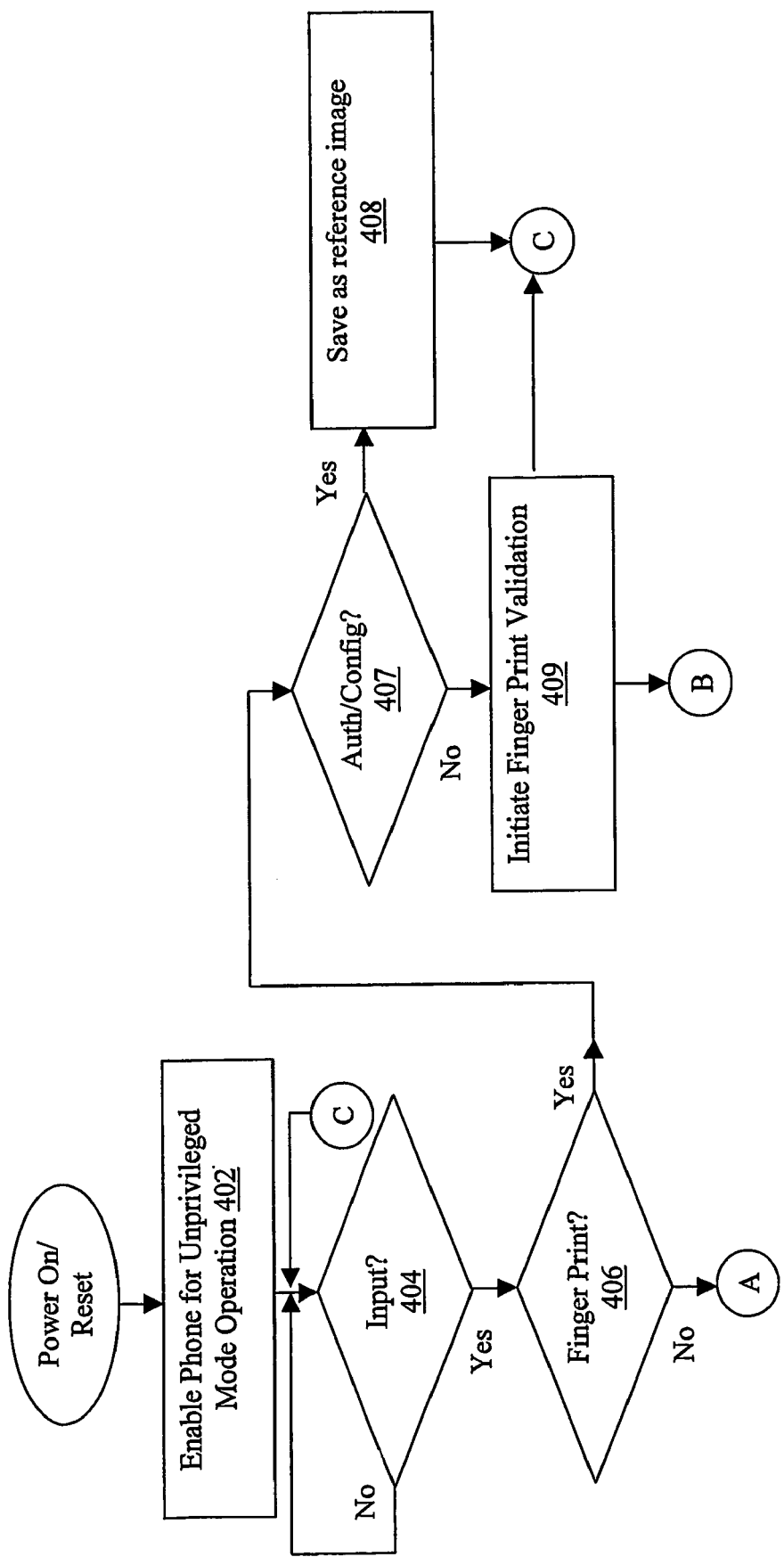
FIGS. 4a-4b illustrate the operational flow of the relevant aspects of the operating logic of FIG. 3b, in accordance with one embodiment.
Figure 4B:
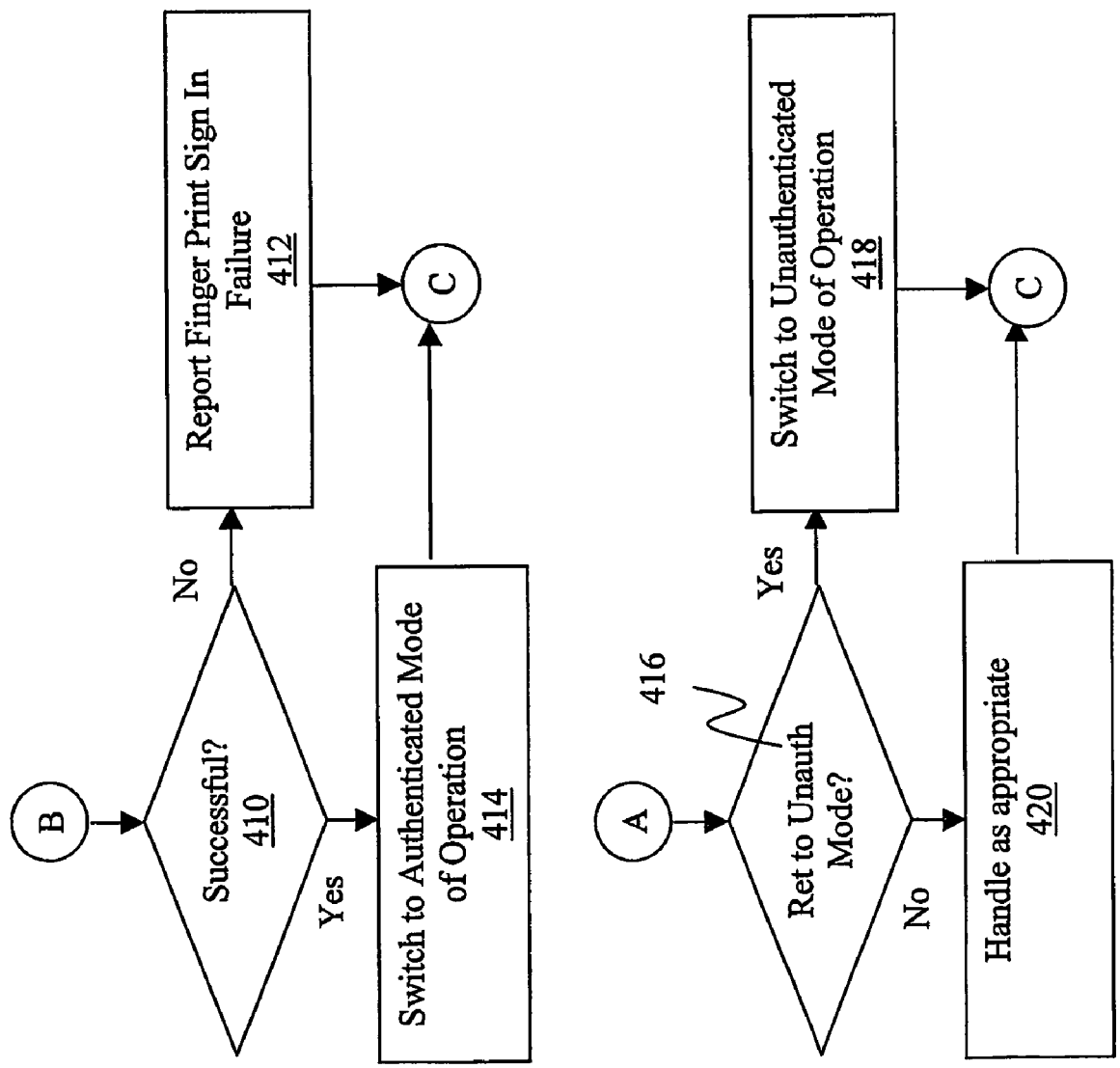

FIG. 4 illustrates the operational flow of the relevant aspects of operating logic 240, in accordance with one embodiment. As illustrated, on start up/reset (such as depression of power on/off button 122 by a user), operating logic 240 enables phone 100 to operate in the earlier described unauthenticated mode, making available only a limited/reduced set of functionalities, block 402. Thereafter, operating logic 240 waits for additional user input, block 404.

Recall from earlier description, on closure of switch circuit 228, power is provided to finger print reader 232 and other components 102-212 of phone 100. Thus, if a user continues to keep his/her finger on power on/off switch, even after closing switch circuit 228 and powering on phone 100, integrated finger print reader 232, supported by DSP 204, enables a finger print image to be seamlessly inputted for user authentication.

Accordingly, on receipt of inputs. operating logic 240 determines if the input is finger print input provided via finger print reader 232, block 406. In various embodiments, processor 202 may be notified (e.g. interrupted) by DSP 204 upon completion by DSP 204 in generating an input finger image.

If the user input is a finger print image, operating logic 240 (or more specifically, security function 242) determines if phone 100 is operating in the unauthenticated mode, within the configuration mode of the authenticated mode, or the initial provisioning mode, block 407.

If phone 100 is determined to be operating in either, the configuration mode within the authenticated mode, or the initial provisioning mode, operating logic 240 (or more specifically, security function 242) saves the inputted finger print image as a reference finger print image, block 408.

If phone 100 is determined to be operating in the unauthenticated mode, operating logic 240 (or more specifically, security function 242) initiates the finger print based authentication process, authenticating the user by comparing the received input finger print image, against the previously saved reference finger print image, block 409.

If the inputted finger print image does not substantially match the previously saved reference finger print image, block 410, operating logic 240 (or more specifically, security function 242) reports the authentication failure, block 412, and continues to operate phone 100 in the unauthenticated mode at block 404.

However, if the inputted finger print image substantially matches the previously saved reference finger print image, block 410, operating logic 240 (or more specifically, security function 242) enables phone 100 to operate in the authenticated mode, block 414. Thereafter, operating logic 240 continues operation at block 404.

The precision level at which an inputted finger print image is to be considered substantially matching with a reference finger print image is application dependent. Preferably, different user selectable precision levels are offered. As with other user selectable options, the selection may be facilitated in any one of a number of known user selection techniques.

Back at block 408, if the input is determined not to be finger print input, operating logic 240 determines if the input is a user instruction to return to the unauthenticated mode of operation (e.g. a user selecting or inputting such command using alphanumeric keys 102 and/or scroll/select keys 105 and 106 while operating in an authenticated mode of operation), block 416.

If the input is determined to be a user instruction to return to the unauthenticated mode of operation, operating logic 240 (or more specifically, security function 242) returns phone 100 to operate in the unauthenticated mode, block 418. Thereafter, operating logic 240 continues operation at block 404.

In one embodiment, before exiting to the unauthenticated mode, operating logic 240 (or more specifically, security function 242) causes a user selectable "resume" (i.e. re-authentication) option to be rendered on display 108. Selection of the option is processed as if phone 100 is being powered on or reset. That is, operating logic 240 causes a finger print of the user to be read and inputted.

If the input is determined to be other user inputs, operating logic 240 handles the other user inputs in an application dependent manner, block 420. In particular, if the input is a user instruction to return to the authenticated mode of operation, operating logic 240 continues operation at block 404, and awaits for finger print input. If the input is other conventional inputs, the inputs are processed as in the prior art. Thereafter, operating logic 240 continues operation at block 404.

Figure 5:
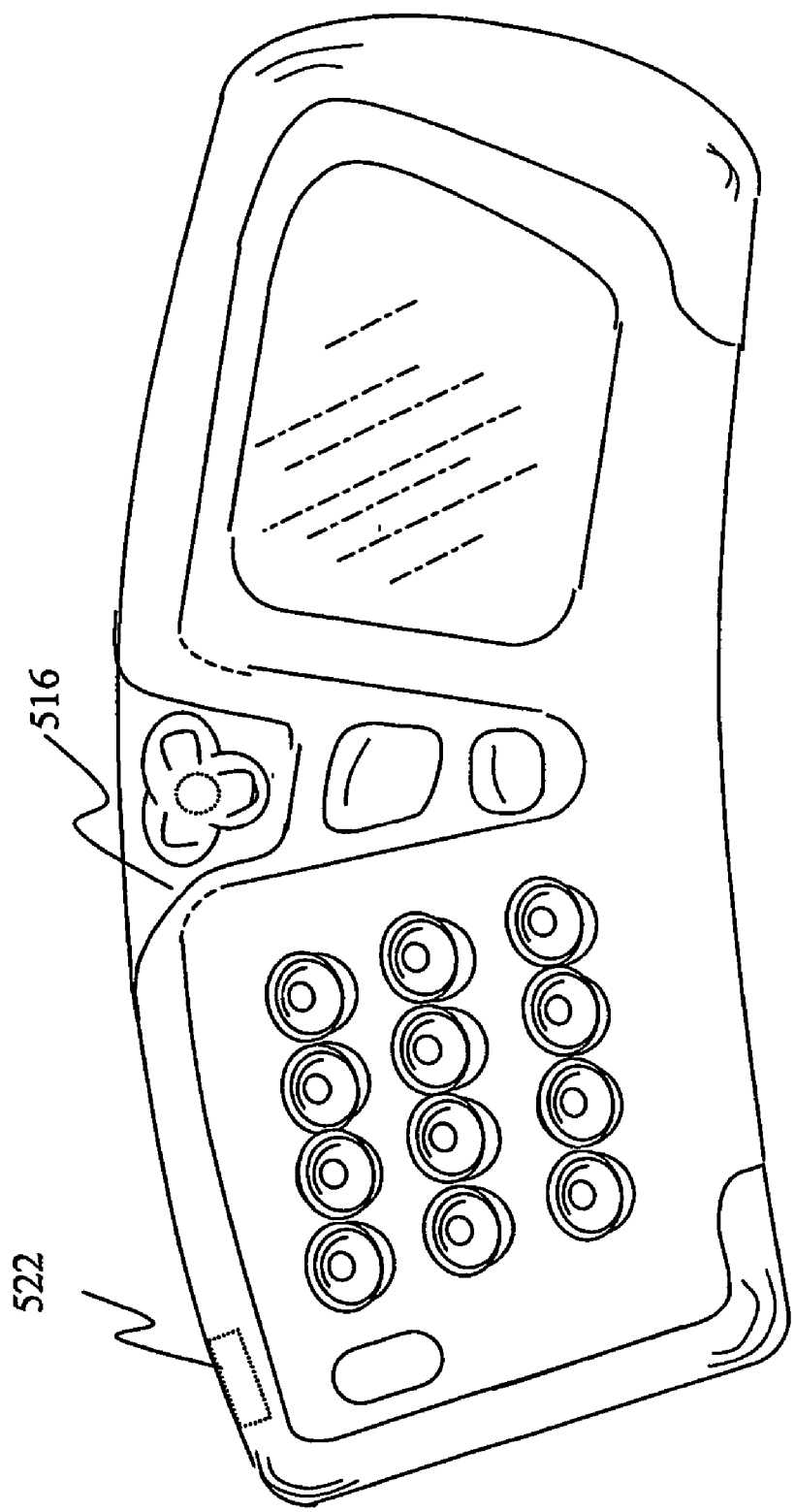
FIG. 5 illustrates a front view of another wireless mobile phone incorporated with the teachings of the present invention, in accordance with an alternate embodiment.

FIG. 5 illustrates another embodiment of the wireless mobile phone of the present invention. More specifically, FIG. 5 illustrates a front view of the alternate embodiment. The alternate embodiment is substantially that of the embodiment of FIG. 1, except that phone 100 is substantially rectangular in shape, whereas phone 500 has a curved shape. Also, power on-off button 522 with integrated finger print reader is disposed at a side surface of body 516 of phone 500 instead.

Figure 6B:
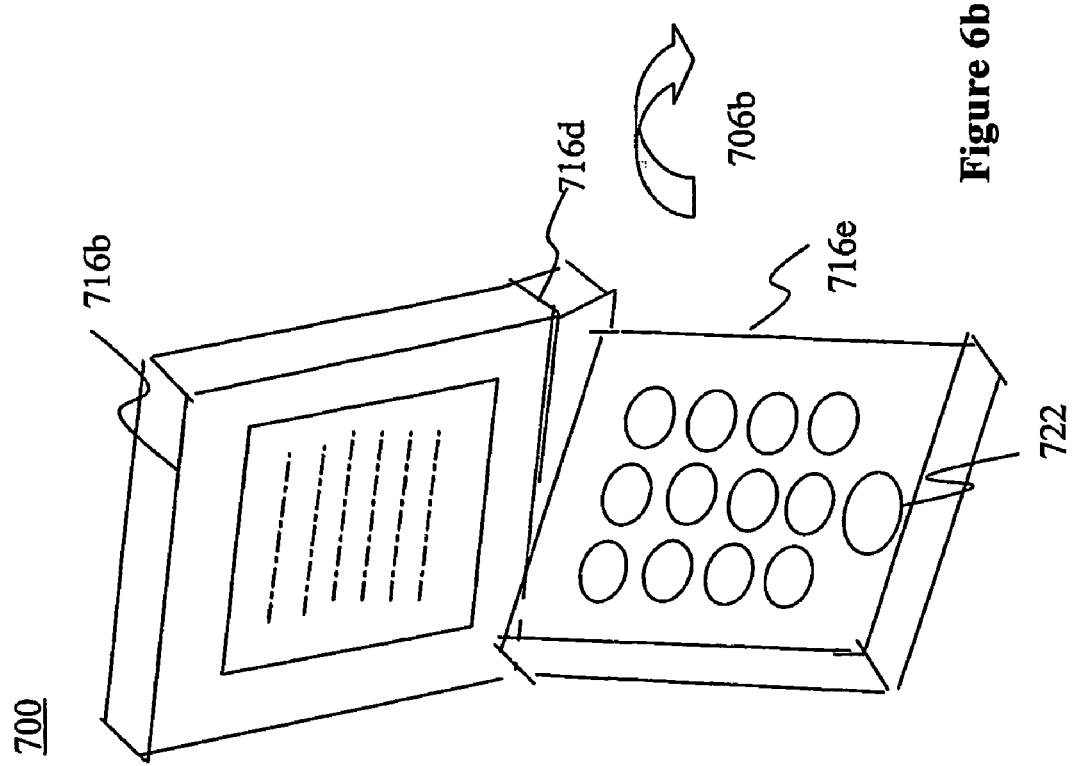
FIGS. 6a-6b illustrate two perspective views of another wireless mobile phone incorporated with the teachings of the present invention, in accordance with yet another embodiment.
Figure 6A:
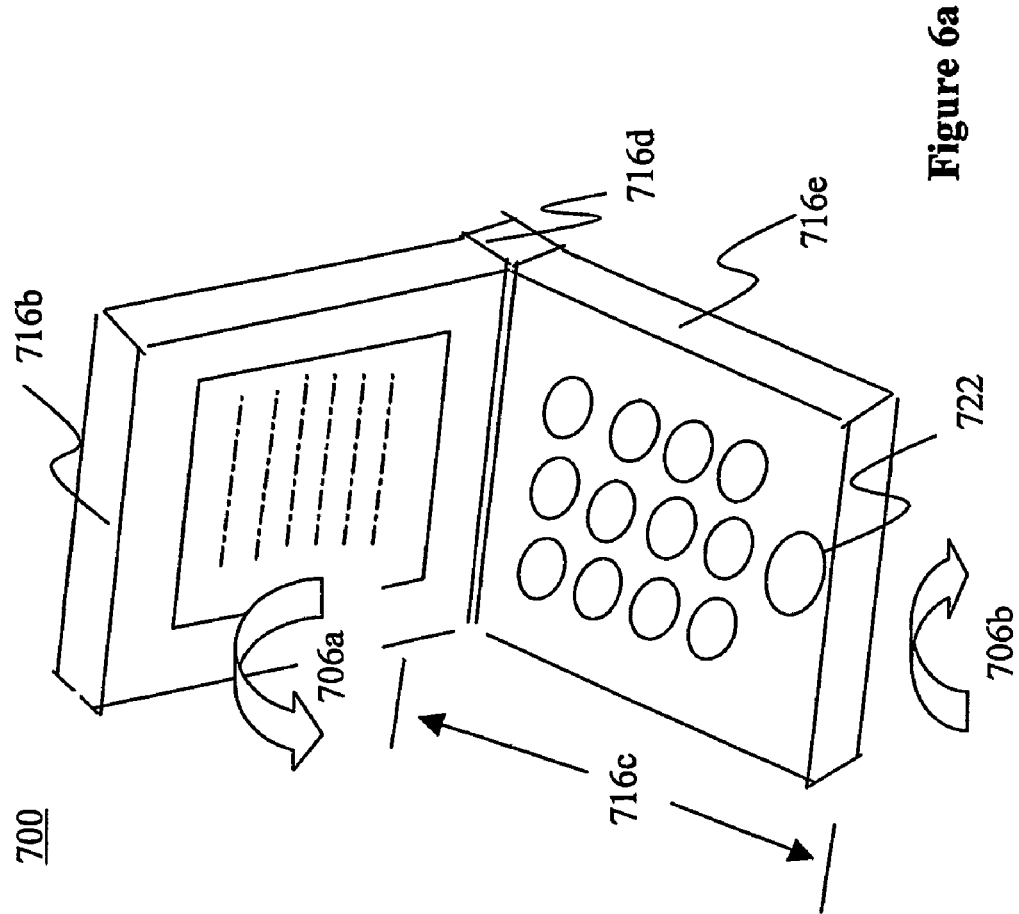

FIGS. 6a-6b illustrate yet another embodiment of the wireless mobile phone of the present invention. More specifically, FIG. 6a-6b illustrate two perspective views of the embodiment. The embodiment is also substantially that of the embodiments of FIGS. 1 and 5, except that phone 100 is substantially rectangular, phone 500 has a curve shaped body, whereas phone 700 has a multi-section body. The multi-section form factor includes a first section 716b and a second section 716c, and the second section 716c is further comprised of at least two sub-sections 716d-716e. The first and second sections 716b-716c may pivot towards each other as denoted by direction arrow 706a or away from each other opposite to the direction denoted by arrow 706a. Sub-section 716d may rotate relative to sub-section 716e as denoted by the directions denoted by arrows 706b. In other words, phone 700 may be considered as an improved version of what is commonly referred to as "flip" phones.

Similar to the earlier described embodiments, phone 700 is provided with operating logic having a security function as earlier described, and power on/off button 722 with an integrated finger print reader. Except, power on/off button 722 with the integrated finger print reader is disposed at a front surface of lower section 716c of phone 700 instead.

In alternate embodiments, second section 716c may be a uni-section, i.e. it is not further sub-divided into to relatively pivotable sub-sections.

In yet other embodiments, the reference figure print image may be provided to the wireless mobile phone in a secure manner, e.g. read from an identity card, via an identity card reader additionally provided to the wireless mobile phone.

Figure 7B:
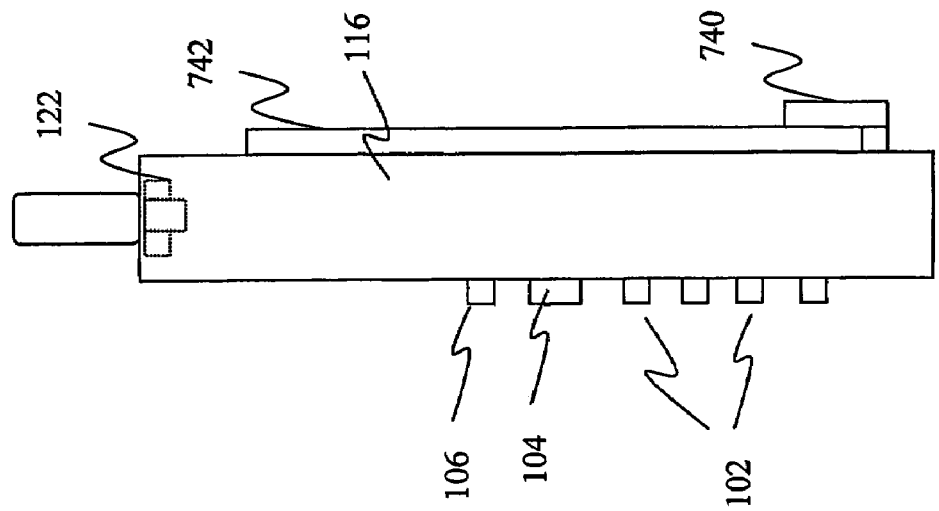
FIGS. 7a-7b illustrate a front view and a side view of another wireless mobile incorporated with another aspect of the teachings of the present invention, in accordance with yet another embodiment.
Figure 7A:
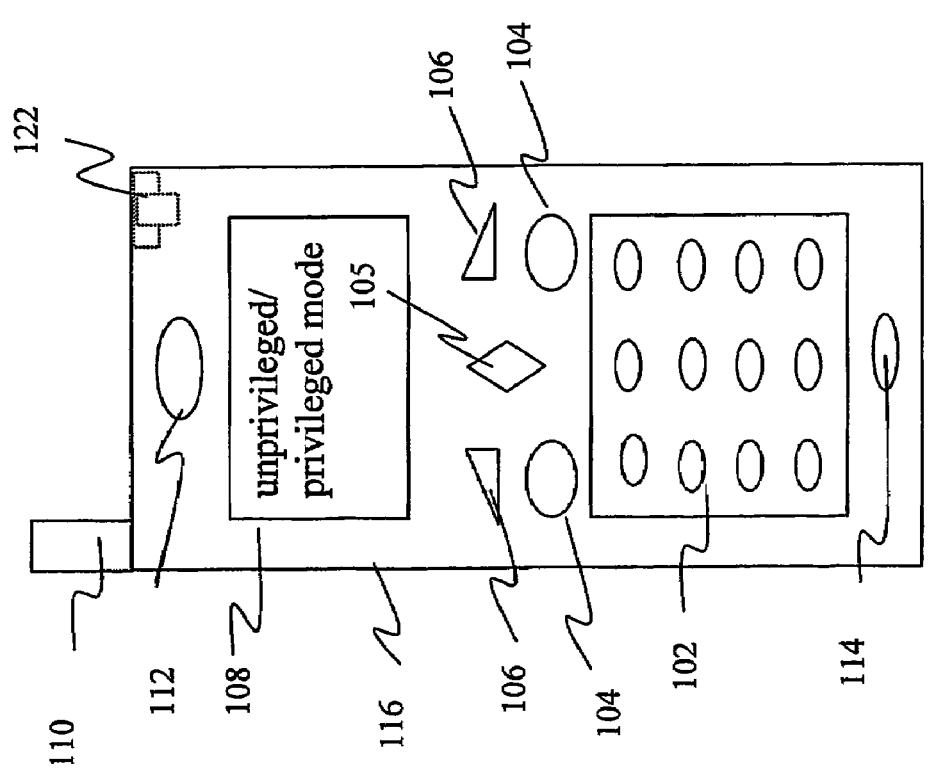

FIGS. 7a-7b illustrate one such embodiment. As illustrated in FIG. 7b, wireless mobile phone 100 is additional endowed with an identity card reader 740. Identity card reader 740 (optionally, assisted by a device driver additionally provided to supplement operating logic 240) is equipped to retrieve the earlier described reference finger print image from identity card 742.

Preferably, identify card 742 has a form factor that is difficult to forge, and its issuance is governed by a secured process. Resultantly, security for wireless mobile phone 100 is further enhanced.

Figure 8B:
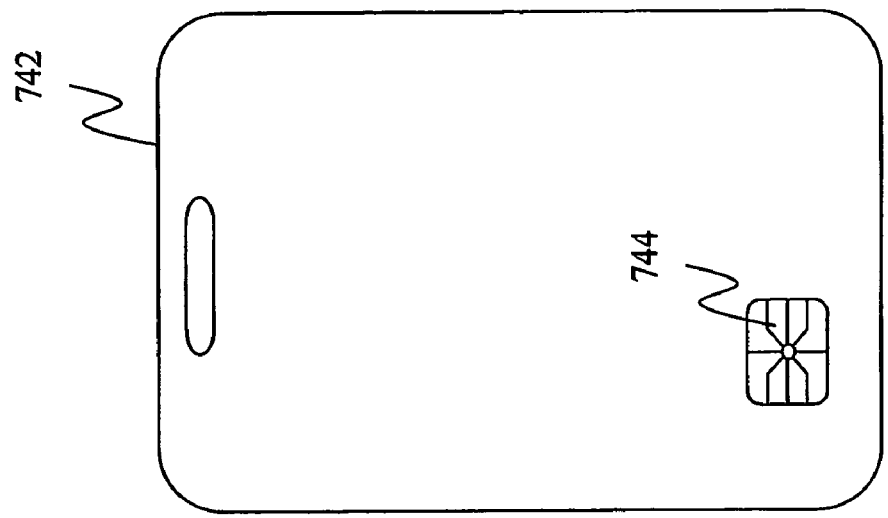
FIGS. 8a-8b illustrate a front view and a back view of the identity card of FIG. 7b in further detail, in accordance with one embodiment.
Figure 8A:
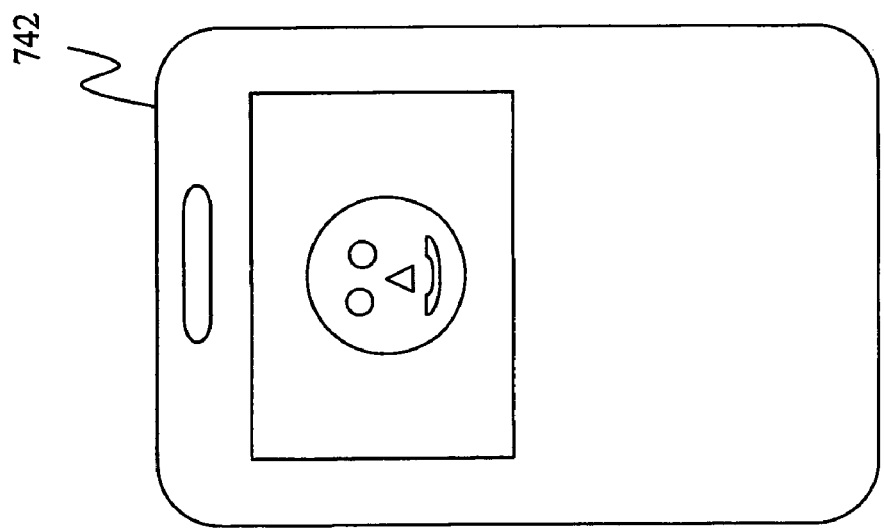

For the embodiment, identity card 742 comprises a smart electronic card 744 (commonly referred to as a smart card) (see FIG. 8a-8b), and the reference finger print image is pre-stored in the embedded smart card 744. Operating logic 240 (optionally, supplemented by a corresponding reader device driver) retrieves the reference finger print image from embedded smart card 744, on detection of the presence of identity card 742.

In various embodiments, the reference finger print image may be further protected via encryption, requiring operating logic 240 to posses the proper decryption key to recover the reference finger print image after retrieval.

In yet other embodiments, the reference finger print image may be further protected via an authentication protocol, requiring wireless mobile phone 100 to be equipped with the appropriate credential to authenticate itself to smart card 744, before being allowed by smart card 744 to access the pre-stored reference finger print image in smart card 744.

In yet other embodiments, the reference finger print image may be imprinted on identity card 742, and identity card reader 720 is an optical reader.

In yet still other embodiments, the reference finger print image may be encoded via a magnetic strip disposed on a surface of identity card 742, and identity card reader 720 is a magnetic code reader.

These are just a few example, other equivalent encoding/storing and reading/retrieving techniques may also be employed instead.

CONCLUSION AND EPILOGUE

Thus, it can be seen from the above descriptions, a novel wireless mobile phone that can afford protection against unauthorized access to user data and/or usage of the phone has been described.

While the present invention has been described in terms of the foregoing embodiments, those skilled in the art will recognize that the invention is not limited to the embodiments described. The present invention can be practiced with modification and alteration within the spirit and scope of the appended claims.

In particular, the present invention may be practiced with the finger print reader (optical or otherwise) not being integrated with power on/off button, as well as employing additional and/or other means to authenticate a user.

Thus, the description is to be regarded as illustrative instead of restrictive on the present invention.

What is claimed is:

1. An apparatus comprising:
    a plurality of components;
    a power on/off button to power on/off the apparatus, including an input mechanism configured to facilitate input of a finger print of a user; and
    an operating logic configured to receive the output signals from the input mechanism, to operate the plurality of components in a first mode if the user is not successfully authenticated based at least on the output signals, to operate the plurality of components in a second mode if the user is successfully authenticated based at least on the output signals, and to switch from the second mode to the first mode responsive to a user instruction;
    wherein a first plurality of user functions are available in the first mode, and a second plurality of user functions comprising at least one or more of the first plurality of user functions are available in the second mode.

2. The apparatus of claim 1, wherein said input mechanism comprises a light source to emit light, and an array of light sensors to sense the emitted light reflecting off a user's finger.

3. The apparatus of claim 2, further comprising processing logic associated with the input mechanism to process the reflected light sensed into an input finger print.

4. The apparatus of claim 1, wherein the operating logic farther comprises logic to compare the output signals indicating the finger print against a reference finger print.

5. The apparatus of claim 1, further comprising a reader to facilitate provision of a reference finger print via an identity card.

6. The apparatus of claim 5, wherein the reference finger print is stored on said identity card in a manner to be read by a reader selected from the reader group consisting of an electronic reader, an optical reader, and a magnetic reader, and the reader is a corresponding selected one of the electronic reader, the optical reader and the magnetic reader.

7. The apparatus of claim 1, wherein the input mechanism further comprising one or more capacitors, and one or more sensors coupled to the one or more capacitors to sense electrical interactions with the user's finger, and to output signals indicating the user's fingerprint.

8. A method comprising:

sensing by an apparatus activation of a power on button by a user;

receiving by the apparatus, through said activation, finger print input from the user, the power on button including input mechanism for the user to input the user's finger print;

processing by the apparatus the sensed interactions into output signals indicating the received finger print input;

authenticating by the apparatus the user based on at least the output signals;

operating by the apparatus a plurality of components of the apparatus in a first mode, wherein a first plurality of user functions are available while the operating the plurality of components in the first mode, if the user is not successfully authenticated;

operating by the apparatus, the plurality of components in a second mode, wherein a second plurality of user functions are available while the operating the plurality of components in the second mode, if the user is successfully authenticated; and switching back by the apparatus from the second mode to the first mode responsive to a user instruction;

wherein the second plurality of user functions comprising at least one or more of the first plurality of user functions.

9. The method of claim 8, wherein said receiving of finger print input from the user further comprising emitting light using a light source, sensing the emitted light reflecting off the user's finger using a plurality of optical sensors, and processing the reflected light sensed into a finger print input.

10. The method of claim 9, wherein the authenticating further comprises comparing the output signals indicating the inputted finger print against a reference finger print.

11. The method of claim 10, wherein the method further comprises retrieving the reference finger print from an identity card.

12. The method of claim 8, wherein the authenticating further comprising authenticating the user's fingerprint with one or more sensors coupled to one or more capacitors to sense electrical interactions with the user's finger, and to output signals indicating the user's fingerprint.

13. A wireless mobile phone comprising:

a power on/off button to power the wireless mobile phone on or off, including an input mechanism to capture finger print of a user activating the power on/off button;

a plurality of components coupled to each other configured to facilitate wireless telephony communication by a user, with the components being equipped to operate in at least a selected one of a first mode and a second mode, wherein a first plurality of user functions are available while the components are configured to operate in the first mode, and a second plurality of user functions are available while the components are configured to operate in the second mode; and operating logic configured to operate the components in said first mode without authentication of the user, and to operate the components in said second mode if the user is successfully authenticated based at least in part on the captured finger print;

wherein the second plurality of user functions comprising at least one or more of the first plurality of user functions, and the operating logic is further configured to be responsive to a user instruction to switch from the second mode to the first mode.

14. The wireless mobile phone of claim 13, wherein the plurality of components further comprising optical or capacitive sensors to capture the user's finger print.

15. A method, comprising:

sensing by a wireless mobile phone, activation of a power button of a wireless mobile phone by a user;

capturing by the wireless mobile phone, through said activation, finger print of the user;

authenticating by the wireless mobile phone, the user based at least in part on the captured finger print;

operating by the wireless mobile phone, a plurality of components of the wireless mobile phone to facilitate wireless telephony communication by the user, in a first mode, wherein a first plurality of user functions are available while the operating the plurality of components in the first mode, if said authenticating of the user is unsuccessful;

operating by the wireless mobile phone, the components in a second mode, wherein a second plurality of user functions are available while the operating the plurality of components in the second mode, if the authenticating of the user is successful; and switching the wireless mobile phone from the second mode to the first mode responsive to a user instruction;

wherein the second plurality of user functions comprising at least one or more of the first plurality of user functions.

16. The method of claim 15, wherein the capturing comprises capturing the user's finger print with optical or capacitive sensors.

* * * * *

UNITED STATES PATENT AND TRADEMARK OFFICE
CERTIFICATE OF CORRECTION

PATENT NO. : 7,613,446 B2
APPLICATION NO. : 10/550925
DATED : November 3, 2009
INVENTOR(S) : G. Eric Engstrom and Peter Zatloukal It is certified that error appears in the above-identified patent and that said Letters Patent is hereby corrected as shown below:

At column 8, line 61, "The apparatus of claim 1, wherein the operating logic farther comprises logic" should read --The apparatus of claim 1, wherein the operating logic further comprises logic--.

At col. 9, line 28, "operating by the apparatus, the plurality of components" should read --operating by the apparatus the plurality of components--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,613,446 B2  Page 1 of 1
APPLICATION NO. : 10/550925
DATED : November 3, 2009
INVENTOR(S) : Engstrom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this

Nineteenth Day of October, 2010

David J. Kappos
*Director of the United States Patent and Trademark Office*